United States Patent [19]

Smart

[11] 4,170,834
[45] Oct. 16, 1979

[54] METHOD AND DEVICE FOR FOREIGN LANGUAGE LEARNING AND TEACHING BY MEANS OF RECORDINGS

[76] Inventor: Ian R. Smart, 10, Avenue Frémiet, 75016 Paris, France

[21] Appl. No.: 785,278

[22] Filed: Apr. 6, 1977

Related U.S. Application Data

[63] Continuation of Ser. No. 643,564, Dec. 22, 1975, abandoned.

[30] Foreign Application Priority Data

Dec. 24, 1974 [FR] France .................. 74 42754

[51] Int. Cl.² .................. G09B 5/04; G09B 19/06
[52] U.S. Cl. .................. 35/35 C; 35/8 A
[58] Field of Search ............ 35/8 A, 9 A, 22 R, 35 C, 35/48 R; 360/63, 72

[56] References Cited

U.S. PATENT DOCUMENTS

| | | | |
|---|---|---|---|
| 2,777,901 | 1/1957 | Dostert | 35/35 C X |
| 2,911,482 | 11/1959 | Dostert | 35/35 C X |
| 3,177,594 | 4/1965 | Demo | 35/35 C |
| 3,200,516 | 8/1965 | Parker | 35/35 C |
| 3,217,428 | 11/1965 | Spaulding | 35/35 C |
| 3,484,955 | 12/1969 | Lippert | 35/35 C |
| 3,550,289 | 12/1970 | Orita et al. | 35/35 C |
| 3,600,826 | 8/1971 | Thomas | 35/22 R |
| 3,947,972 | 4/1976 | Freeman | 35/8 A |

Primary Examiner—Vance Y. Hum
Attorney, Agent, or Firm—Kenyon & Kenyon

[57] ABSTRACT

The device consists of an instructor station (1) connected to a number of paired learner stations (2, 3). The instructor station comprises two twin channel recording-playback machines (4, 5) and a switching, mixing and amplifying device to supply the learner stations (2, 3) through connecting cables (7) and junction boxes (8) in accordance with the various steps of the teaching process. The learner stations are each equipped with a headset having two independent earphones. Two mobile microphones (10, 11) may be connected to the microphone input sockets (12, 13) provided on the switching, mixing and amplifying device (6) and the junction boxes (8) (FIG. 4).

4 Claims, 8 Drawing Figures

Fig. 3b. (suite de la Figure 3a)

METHOD AND DEVICE FOR FOREIGN LANGUAGE LEARNING AND TEACHING BY MEANS OF RECORDINGS

This is a continuation of application Ser. No. 643,564 filed Dec. 22, 1975 and now abandoned.

The present invention relates to a method and a device for teaching foreign languages through the use of comparative recordings prepared and presented diphonically, and to the recordings so prepared and presented for use in the method, either most conveniently in the form of magnetic tapes, or in any other equivalent form.

Previously existing methods of teaching foreign languages by use of comparative magnetic tape recordings have all been based on the principle of an "instructor" track, which is protected from erasure by the learner, and an accompanying "learner" track, which can be recorded and erased at will. During playback, these two tracks are read simultaneously and reproduced monophonically in the two earphones of the learner's headset.

It has been found that the methods based on this technique do not in themselves enable a learner to attain proper linguistic proficiency, however vigorous or prolonged individual efforts to do so may be. It has likewise been found with the technique concerned that phenomena of boredom and purely mechanical response arise most detrimentally to any normal progression of the desired language learning process.

The present invention provides a new method of teaching foreign languages by means of recordings which enable the learner, within definable and comparatively short time limits, to attain satisfactory levels of passive and active competence in understanding a given foreign language and expressing himself in it. Through its speed and the variety of its possibilities, the method avoids the danger of boredom and purely mechanical response.

The method assumes three broad skills as basic in language learning:

(a) the ability to understand the foreign language without reference to the mother tongue;

(b) the ability to produce correct stimulated forms of expression in the foreign language without reference to the mother tongue;

(c) the ability to produce correct, spontaneously generated forms of expression in the foreign language.

The method itself is characterized by the following five principles:

(1) it employs a binaural sound system with two independent earphones per headset and diphonic recordings whose two channels can be used either independently in monophonic mode or in conjunction in diphonic mode;

(2) it employs a technique of audio stimulation followed by a corresponding comparative performance; an essential characteristic of the method is that this performance is supplied to the learner with only the delay time needed by a native speaker to respond to the stimulation concerned;

(3) it provides for the regular pairing of learners;

(4) it requires a considerable mass of linguistic material to be presented in relatively short periods of time and invariably at a normal speed of utterance for the language concerned;

(5) it requires later verification to be made of the learner's spontaneously generated forms of expression, which must thus be recorded en bloc.

"Diphony" and its derivatives are to be taken throughout the present description as referring to independent diphony, defined as the simultaneous production by two distinct and separate channels of two sounds or sound continua, each of which constitutes a separate, different and autonomous sound entity; by "monophony" and its derivatives is here always meant double monophony, defined as the simultaneous production by two distinct and separate channels of one and the same sound or sound continuum.

The invention also comprises the recording required for practical application of the method. This is a synchronized twin channel recording in which each channel provides a succession of recorded zones alternating with unrecorded zones in respect of the forward motion of the recording as a whole. In one version of this recording, the first channel carries the series of audio stimuli, and the second channel the corresponding comparative performances, the time lag between the stimuli on channel one and the performances on channel two corresponding, at normal playback speed, to the reaction time of the average native speaker to the stimuli concerned. In a second version of the recording, both channels provide audio stimuli together with the corresponding comparative performances, the material being recorded in such a way that the performance required by channel one completes the partial stimulus provided by channel two. In this latter version, the time lag between stimulus and comparative performance on channel one is as already described; on channel two however, it corresponds to the time needed for the performance required by channel one, plus the reaction time of the average native speaker to the double stimulation involved.

The invention further comprises an installation for teaching foreign languages by means of the recordings described above within the general framework of the method of the invention.

The recordings referred to, and an embodiment of the requisite teaching installation, here presented as non exhaustive and non limitative examples of the techniques involved, are shown diagrammatically as follows:

FIGS. 3a and 3b illustrate a twin channel recording for cued conversation practice with FIG. 3b being a continuation of FIG. 3a;

Figure 4:
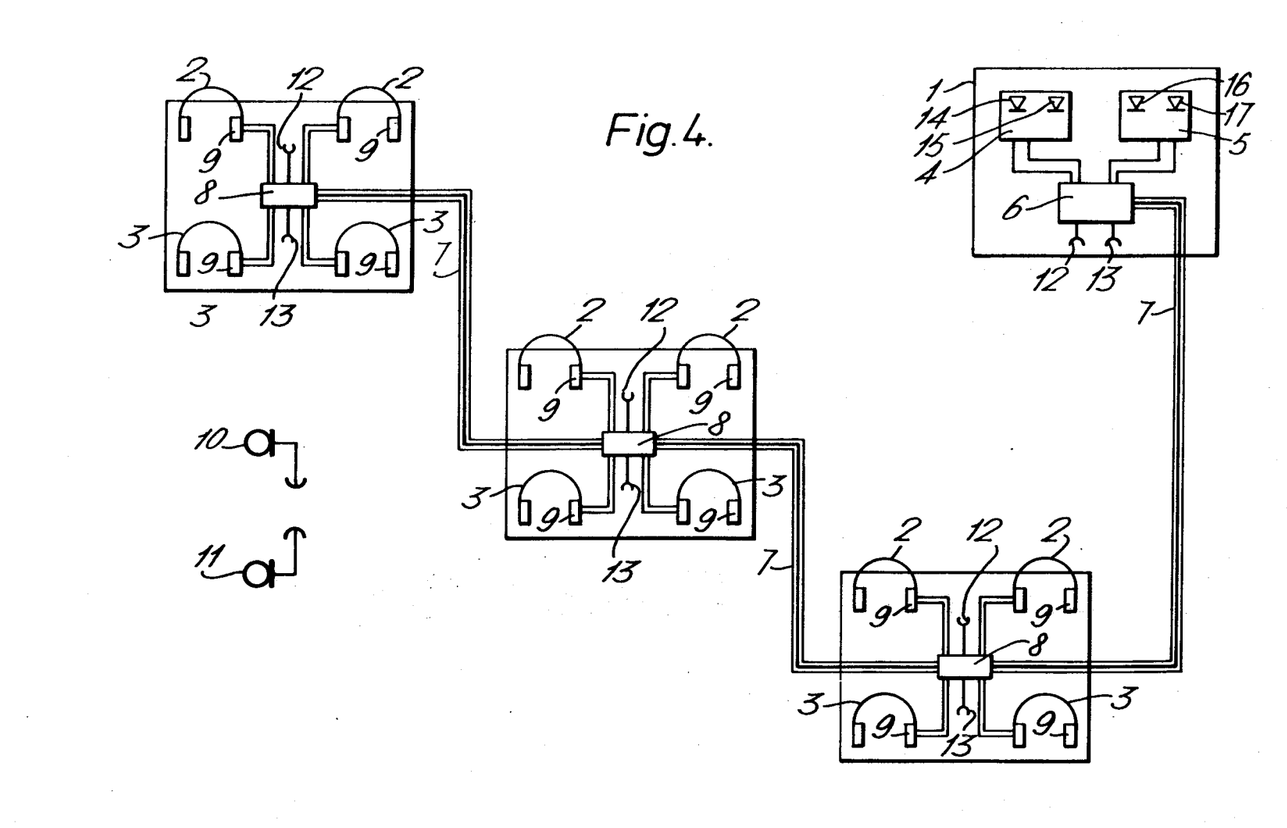
FIG. 4 gives a schematic view of an installation as specified by the invention to provide twelve learner positions at three tables.

As shown by FIG. 4, an installation for the teaching of foreign languages specified in the invention consists basically of an instructor station (1) connected to a number of paired learner stations (2, 3). The instructor station (1) comprises two twin channel recording-playback machines (4, 5) and a switching, mixing and amplifying device (6) to supply the learner stations (2, 3) through connecting lines (7) and junction boxes (8) in accordance with the various steps of the teaching process. The learner stations are each equipped with a headset having two independent earphones (9). Two mobile microphones (10, 11) may be connected to the microphone input sockets (12, 13) provided on the switching, mixing and amplifying device (6) and on each of the junction boxes (8). One of the recording-playback machines (4 or 5) is used to reproduce the various work recordings, and the other (5 or 4) to re-record these recordings, to re-record them with input mixed in from the microphones, or to record the latter microphone input alone, as is required. Playback and/or recording on either or both of the recording-playback machines (4, 5) may be monitored over the loudspeakers of these machines (14, 15, 16, 17).

The connecting lines (7) between the switching, mixing and amplifying device (6) and the junction boxes (8) consist of an insulated cable with four separately shielded conductors for the headset lines, and an insulated cable with two separately shielded conductors for the microphone lines. In each cable the shielding constitutes the return line. There is no shield connection from one cable to the other.

Figure 5:
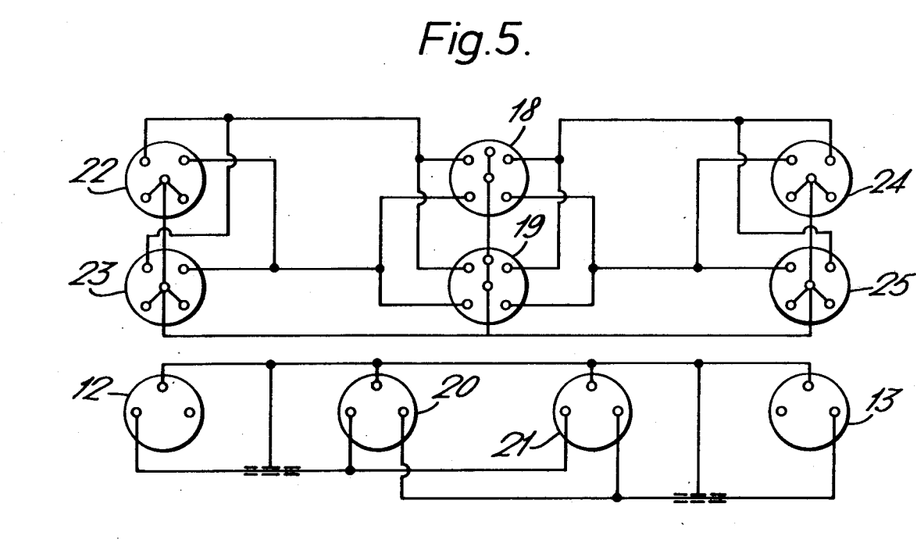
FIG. 5 is a wiring diagram of the junction boxes (8) shown in FIG. 4.

The junction boxes shown in FIG. 5 are each provided with two symmetrical input-output sockets (18, 19) for two separate lines of headsets containing two independent earphones each, two symmetrical input-output sockets (20, 21) for two separate microphone lines, two output sockets (22, 23) for headsets with two independent earphones connected in parallel to one of the headset lines, two output sockets (24, 25) for headsets with two independent earphones connected in parallel to the other headset line, and two microphone input sockets, one (12) connected to the left microphone line, and the other (13) to the right microphone line. In order to prevent crosstalk, all wiring in the headset circuits is shielded in the same way as in the microphone circuits.

Figure 6:
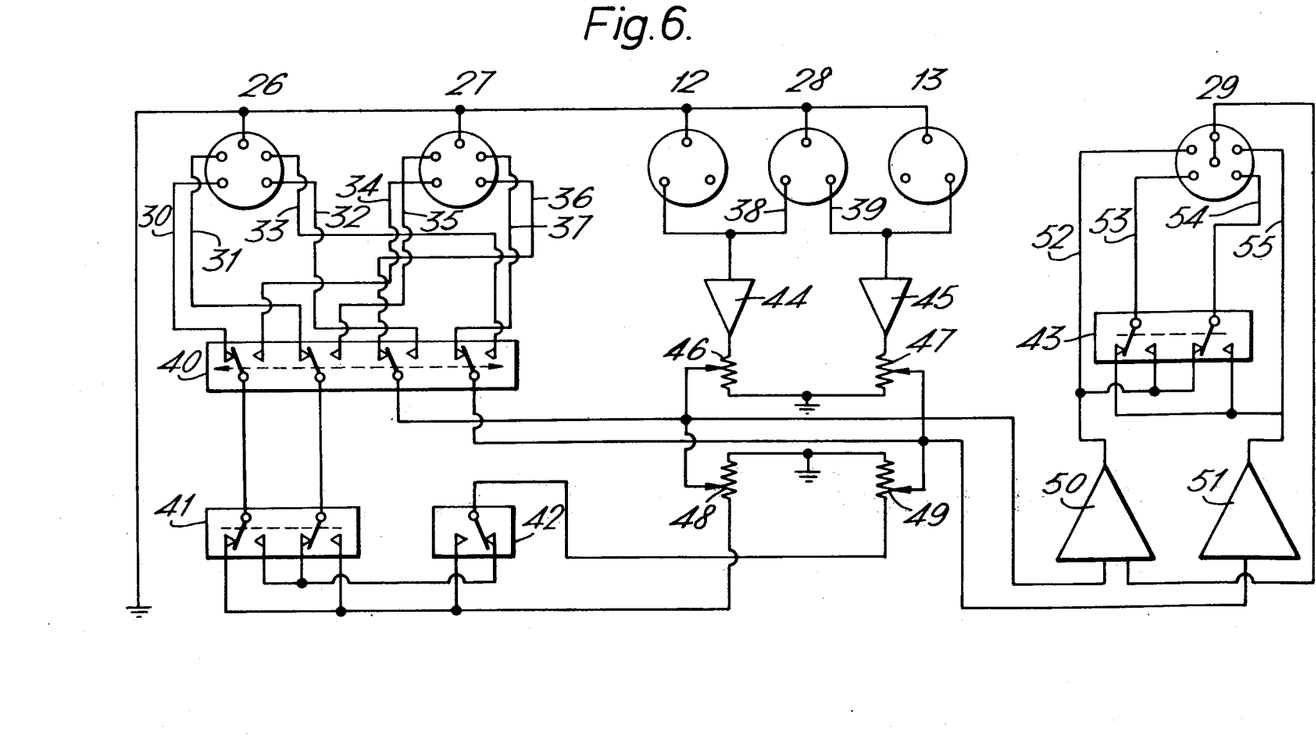
FIG. 6 is a synoptic diagram of the switching, mixing and amplifying device (6) shown in FIG. 4.

The switching, mixing and amplifying device shown in FIG. 6 is provided with an input-output socket (26) for the first recording-playback machine (4), an input-output socket (27) for the second recording-playback machine (5) an input socket (28) for two microphone lines, an input socket for the left microphone (12), an input socket for the right microphone (13), and an output socket (29) for the two lines of headsets with two independent earphones each. Switching prior to power amplification is effected by the three relays (40, 41, 42) on the left-hand side of the figure. The first of these relays (40) switches connections to the recording-playback machines (4, 5) so that either one may be used as the playback machine, the remaining machine then being automatically available as the recording unit. The work position of this relay shown in the diagram connects the playback output of the left channel (30) and the playback output of the right channel (31) of the first machine (4), and the recording input of the left channel (36) and the recording input of the right channel (37) of the second machine (5). The rest position of the relay, on the contrary, connects the playback output of the left channel (34) and the playback output of the right channel (35) of the second machine (5), and the recording input of the left channel (32) and the recording input of the right channel (33) of the first machine (4). The second relay (41) is a channel reverse switch to enable the first and second channels of a diphonic recording to be reversed in relation to the left and right earphones of a headset with independent earphones. It is shown in the non-reversing position. In association with the mode switching relay (42) described below, this relay (41) also enables the first or the second channel of a diphonic recording to be selected during playback of a single channel. In association with the systems switching relay (43) described below, and with the mode switching relay (42) set to the diphonic position, it further enables the signals sent respectively over one line of headsets and the other to be reversed. The work position of this relay is the reversed channel position. The third relay (42) is a mode switch which enables a diphonic recording to be played back either diphonically or channel by channel in monophony. It is shown in the diagram in the work position, corresponding to diphonic reproduction. In monophonic reproduction, the channel heard over the earphones is channel one or channel two according to the setting chosen for the channel reverse switch (41) described above.

Signals from the playback machine (4 or 5) and input from the microphone lines (38, 39), previously amplified by the FET-type microphone preamplifiers (44, 45), are mixed as available, gain control being provided on all sources (46, 47, 48, 49). The resulting signal, mixed or not as the case may be, is then used to drive the two power amplifiers (50, 51) simultaneously with the input circuits of the machine (5 or 4) connected in as the recorder by the connection switching relay (40) already described. It should be noted that the three relays (40, 41, 42) ahead of the mixing circuits have no effect on any input the microphone lines may supply.

Power amplification and distribution of the signals so switched and mixed are represented together to the right of FIG. 6. Each of the power amplifiers (50, 51) permanently drives one side of one of the lines of headsets, the left side (52) of the first line in the case of amplifier 50, and the right side (55) of the second line in the case of amplifier 51. The systems switching relay (43) then enables the remaining side of each line, viz. the right side (53) of the first line and the left side (54) of the second line, to be supplied with signals from one or other of the two amplifiers. In the work position shown, the systems switching relay (43) connects up a common program system: both headset lines (52–53, 54–55) receive the same signals, which are monophonic or diphonic according to the position of the mode switching relay (42). In the rest position, the systems switching relay (43) connects up a separate program system: with the mode switch (42) here necessarily set to the diphonic position, the first headset line (52–53) is supplied monophonically with one of the channels by amplifier 50, and the second headset line (54–55) is supplied monophonically with the other channel by amplifier 51, the two channels being reversable at all times through use of the channel reverse relay (41). It is to be noted that, in both cases, the left microphone line can be heard only over the first headset line (52–53), and the right microphone line only over the second headset line (54–55).

Figure 7:
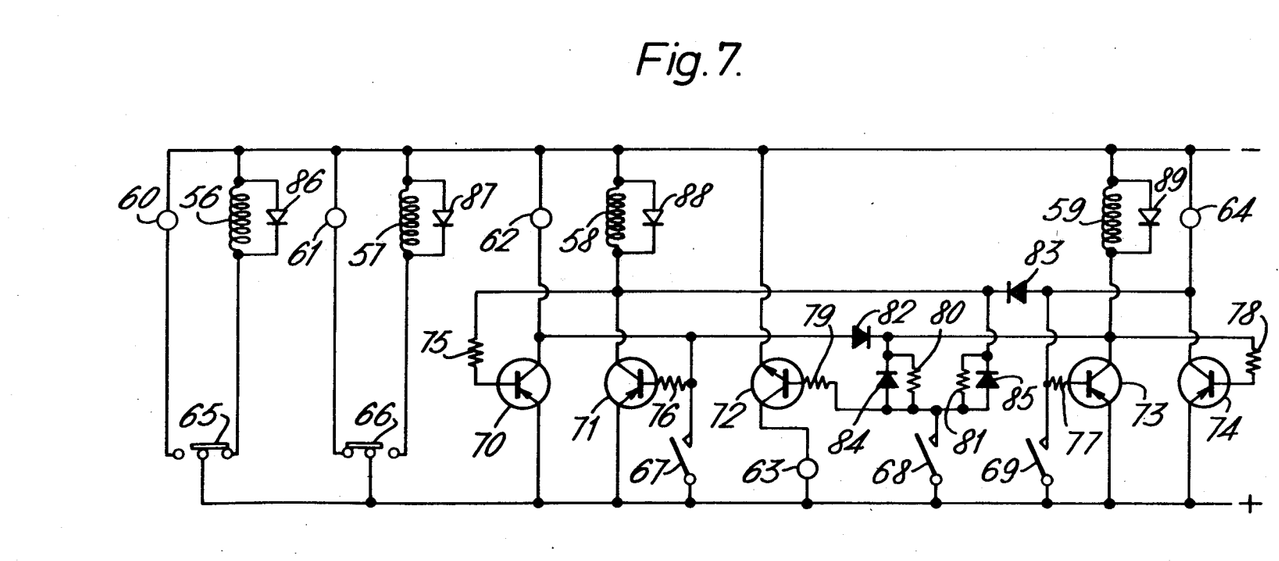
FIG. 7 is the circuit diagram of a device to actuate the relays (40, 41, 42, 43) shown in FIG. 6.

FIG. 7 shows the control device used to effect the switching operations described above. The coil (56) of the connection switching relay (40) of the recording-playback machines is controlled by a sliding single-pole double-throw switch (65). The red indicator lamp (60) glows only when the relay is in the rest position; it then shows that the second recording-playback machine is connected in as the playback machine. The coil (57) of the channel reverse relay (41) is similarly controlled by a sliding single-pole double-throw switch (66). The yellow indicator lamp (61) glows when the relay is in the rest position; it then shows that the playback channels are not reversed. The coil (58) of the mode switching relay (42) and the coil (59) of the systems switching relay (43) are controlled simultaneously by a device comprising five transistors (70, 71, 72, 73, 74). Since the relays are both of the double-throw type, their use together offers four different possibilities, viz. relay 1 thrown one way, and relay 2 the other; the reverse of this; both relays thrown one way; both relays thrown the other way. Of these four configurations, the first three are employed here to control respectively the common monophonic mode, the separate program system and the common diphonic mode.

The control device for this selection is basically a classical application of two asymmetrical bistable circuits. It will be recalled that a transistor may be either saturated, in which case it is a conductor, or clamped, in which case it is a non-conductor, in a bistable, or "flip-flop," association, one of two transistors is saturated and thereby clamps the second transistor, the arrangement being a stable but reversable one. In the first flip-flop (70, 71) of FIG. 7, the second transistor (71) is clamped if the first (70) is saturated, and the first transistor (70) is clamped if the second (71) is saturated. The same is true of the second flip-flop transistor (73, 74). In this way, if the monophonic mode push-button (67) is used to trigger the device, transistor 70 is saturated and transistor 71 clamped; similarly, transistor 73 is saturated via pilot diode 82, and transistor 74 clamped. Transistors 70 and 73 are now conductors, so that the green indicator lamp (62) lights up and the systems switching relay sets to its work position. The red indicator lamp (64) in these conditions is unlighted and the mode switching relay (42) is in its rest position. If, on the other hand, the separate program push-button (69) is used to trigger the device, transistor 74 is saturated and transistor 73 clamped; similarly, transistor 71 is saturated via pilot diode 83, and transistor 70 clamped. Transistors 74 and 71 are now conductors, so that the red indicator lamp (64) lights up and the mode switching relay (42) sets to its work position. The green indicator lamp (62) in these conditions is unlighted and the systems switching relay (43) in its rest position. Finally, if the diphonic made push-button (68) is used to trigger the device, transistor 71 is saturated via diode 85, and transistor 73 is saturated via diode 84; the two relays (42, 43) are thereby set to their work positions, while the previously lighted indicator lamp (62 or 64) is extinguished. Transistor 72, which is an n-p-n type transistor, is in turn saturated by transistors 71 and 73 through resistors 80 and 81 in series with resistor 79; it therefore lights up the yellow indicator lamp (63), which can only operate if transistor 71 and transistor 73 are together saturated. The bias resistors of transistors 70, 71, 73 and 74 are numbered respectively 75, 76, 77 and 78 in the diagram. The four by-pass diodes numbered 86, 87, 88 and 89 protect the respective relay coils (56, 57, 58, 59) from induction cut-off voltages.

As specified by the invention, the teaching installation thus described is designed to supply the learner headsets in such way as to apply the different principles and techniques of the teaching method. It therefore enables the instructor to choose at will from the following three connection and supply systems:

(a) single channel connection (monophonic mode): this system is controlled by push-button 67 in FIG. 7 and shown to be in operation by the green indicator lamp (62). The mode switching relay (42) of FIG. 6 then being in the rest position, and the systems switching relay (43) in the work position, as earlier described, the two power amplifiers (50, 51) are driven by the same signal source, this being either the first channel of the diphonic recording or the second, depending on the setting of the channel reverse relay (41). In this way, the learner hears the teaching material from a single channel in both earphones of his headset. Simple switching of relay 41 thus enables each channel of a diphonic recording to be used separately.

(b) twin channel connection (diphonic mode): this system is controlled by push-button 68 and shown to be in operation by the yellow indicator lamp (63). The mode switching relay (42) and the systems switching relay (43) are then both in the work position, as stated earlier, so that power amplifier 50 is driven by one signal source and power amplifier 51 by a second signal source, such signal sources being respectively the first and second channels of the diphonic recording, or the second and first, depending on the setting of the channel reverse relay (41). Amplifier 50 then supplies both the left-hand lines of earphones (52, 54), and amplifier 51 both the right-hand lines (53, 55). In this way, learners hear one channel of the recording in their left earphone, and the other channel in their right earphone. The two channels of a diphonic recording can thus be used jointly.

(c) twin channel connection (separate program system): this system is controlled by push-button 69 and shown to be in operation by the red indicator lamp (64). The mode switching relay (42) is then in the work position and the systems switching relay (43) in the rest position, as earlier described, so that power amplifier 50 is driven by one signal source and supplies the left and right earphones of headset line 52-53, and power amplifier 51 is driven by another signal source and supplies the left and right earphones of headset line 54-55, the signal sources being respectively the first and second channels of the diphonic recording, or the second and first, according to the setting of the channel reverse relay (41). One member of a learner pair thus hears the teaching material from one channel of the recording in both earphones of his headset and the other member the material from the other channel. The two channels of a diphonic recording can, in this way, be used independently, each one by half the paired learners.

Use of the two mobile microphones makes it possible in all cases to mix in on one or other of the channels input from the instructor, from a learner, from the instructor and a learner, or from two learners; all such input may additionally be recorded whenever the instructor wishes.

The teaching method will now be disclosed, it being clearly understood that reference to the recordings and to the switching, mixing and amplifying device described above is made solely to present a clearer description of the method, and is not to be taken in any limiting sense.

Connection and supply systems (a) above enables monophonic or diphonic recordings to be reproduced monophonically, thereby rendering the installation compatible with all existing teaching systems and material. In addition, as will be later shown, it makes possible the work of preparation, of verification and of correction which is an essential part of the method according to the invention.

Connection and supply system (b) above enables the diphonic recordings previously described to be used diphonically. With such recordings, the system enables the learner to hear in succession the audio stimuli from the first channel followed by the corresponding comparative performances from the second channel, all stimuli being received on one side of the headset and all comparative performances on the other side. This separate location in space of the stimulus-performance sequence quickly enables the learner to acquire a technique by which he is able to respond himself to stimulation at the same time as he hears the response supplied by the second channel of the recording. In this way, each learner receives the correct response to a given stimulus and can compare it with his own response without having to play back a recording. Since any correction is an immediate one, it will be appreciated that language learning by the method of the invention is far more speedy and effective than by previously existing methods.

Figures 1, 2:
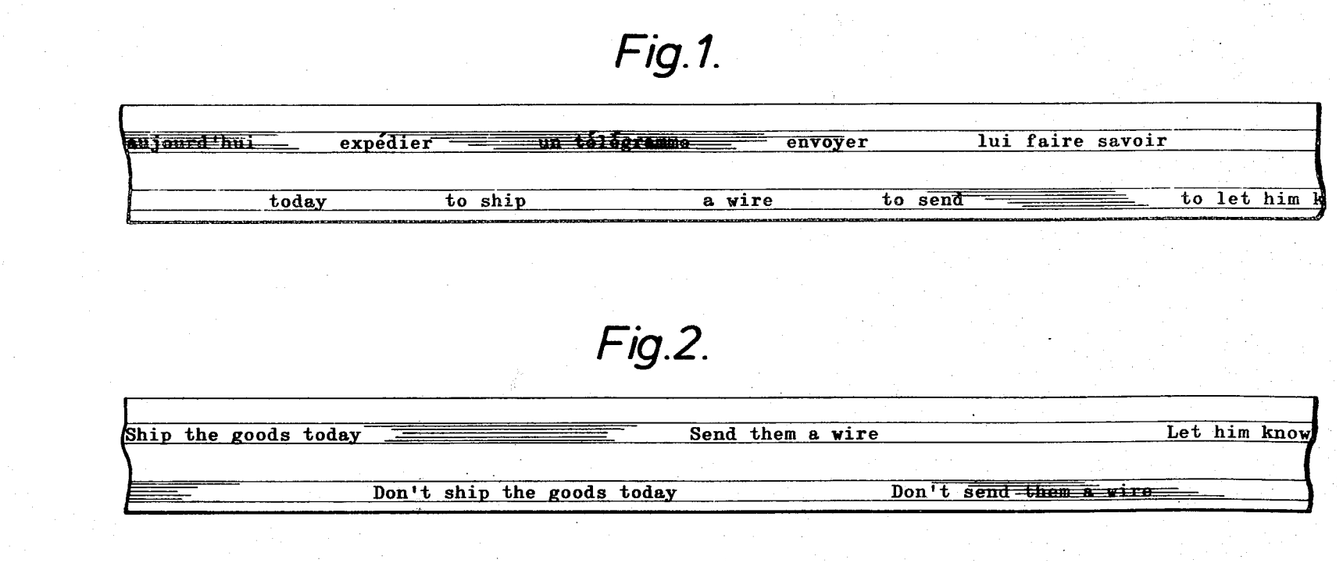
FIG. 1 illustrates a twin channel recording for vocabulary transfer.
FIG. 2 illustrates a twin channel recording for language pattern drills.

It is in this manner that connection and supply system (b) is used for vocabulary transfer in conjunction with twin channel recordings of the type shown in FIG. 1 below, wherein a succession of words in the base language on channel one alternate with their semantic equivalents in the target language on channel two. In such conditions, the learner hears successively each word in the base language on one side, followed by its foreign-language equivalent on the other side, the time lag between each word and its equivalent corresponding to the reaction time allowing the learner, once he has distinguished the word in the base language, to pronounce aloud its foreign-language equivalent at the same time as he hears the correct equivalent recorded on channel two.

Similarly, it is connection and supply system (b) which is used with twin channel recordings of the type shown in FIG. 2 below for language pattern drills: in the case considered, the imperative-negative imperative pattern. In this kind of drill, called a "transformation drill," the recordings on both channels are in the target language, and the transformation of the sentence recorded on channel one into that recorded on channel two has been previously explained by the instructor. The transformation drill is then done in the conditions described for vocabulary transfer, i.e. learners pronounce aloud the transformed sentences at the same time as they hear the correct transformations recorded on channel two.

Figure 3A:
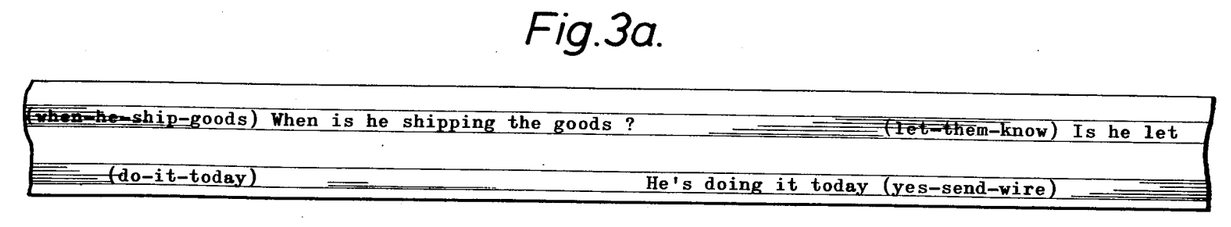
Figures 3A, 3B:
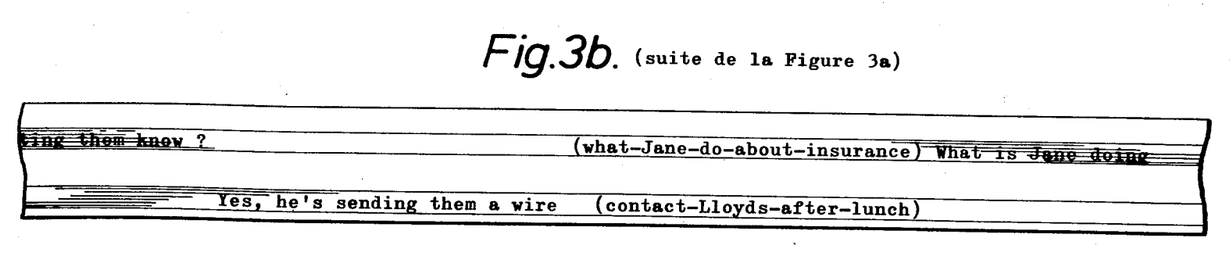

Connection and supply system (c) above enables diphonic recordings of the type shown in FIG. 3 below to be used with separate dispatching for an absolutely new kind of cued conversation practice. With such recordings, the system connects one member of a learner pair to one of the prerecorded channels and the other member to the other, each of the two channels providing successively both stimuli and their corresponding comparative performances. One member of a learner pair is thus cued from channel one of the recording, and addresses his response to this stimulus, in the form of a question for example, to the second member, who has not heard this cueing. The second member has, however, been cued from channel two to answer the question put, and is so able to supply a response to it. Sustained conversation is established in this way between the learner pair, each of whom is unaware either of the question he will be asked or of the answer he will receive. In both cases, the learner hears the correct formulation of his question or answer in accordance with the same principle as before. This technique requires each learner to use one earphone only in order to hear his teammate at the same time; the unused earphones are then set to zero by their individual volume controls, as are the instructor's monitoring speakers.

Connection and supply systems (b) and (c) are fundamental elements of the method, but connection and supply system (a) is no less essential for work in preparing, verifying and/or correcting learner performance. Thus, before transformation drills, sentences on channel one, followed by those on channel two, may be repeated to familiarize the learners with the two opposing patterns. Similarly, it is with the (a) system that vocabulary transfer and command of language patterns is checked. In this case, the learners hear only stimuli, and are called upon to supply the corresponding performances. Gaps or difficulties are then immediately apparent to the learner and his instructor, who are thus able to take quick remedial action. Checks of this kind, moreover, are a normal and effective way for learners to see for themselves progress resulting from a given work period. Finally, when so needed, the (a) system makes possible the repetition of the words of a vocabulary list recorded in the target language, at which time the instructor can quickly correct errors of pronunciation, intonation or stress.

It will be readily appreciated that these three basic types of recordings comprising either one channel recorded in the base language and another channel recorded in the target language, or two channels recorded in the target language, will permit a specialist in the matter to develop a graduated series of lessons based upon them to enable the learner to acquire rapidly an extensive vocabulary, which he is in a position to use without hesitation in the normal linguistic structures of the language in question. It is to be mentioned here that experience shows that vocabulary series of up to one hundred twenty words per recorded unit, and pattern drills of two hundred forty sentences per recorded unit, can be worked without difficulty, the time taken to play back such units ranging from two and a half to four minutes for vocabulary units, and from six to twelve minutes for drill units. The teaching material thus fully complies with principle (4) of the method. Because of the normal progression rate of a group, from the outset provision can be made as part of the method for a basic vocabulary of some four thousand words, covering ninety-five percent of normal needs in spoken and written expression in European languages, for example.

Mention must also be made of the positive contribution paired learning represents in this method; since a language is basically an interactive means of communication between persons, the pairing technique leads to the simulation of real-life use of the target language by learners. Numerous variations are possible, enabling the instructor to develop the distinctive conditions of "human communication" sought and favored by the method. Thus, from the beginning, learners are divided up into pairs, each member of a given pair hearing a different channel of a diphonic recording and addressing to the other his response to the stimuli perceived, such response being initially limited to simple repetition of the stimuli received. At a later stage, one member of the pair repeats stimuli from the recording for the benefit of his teammate, who then carries out a transformation, working without a headset directly from the stimuli received from the first learner. A still later stage puts two learners without headsets diagonally across the table from their teammates; the two learners with headsets supply stimuli direct to their opposite numbers, who then carry out a transformation which they address simultaneously and synchronically to each other. As before, the unused earphones and the monitoring speakers are set to zero for these exercises. In this way, progress is steadily made toward the more advanced cued conversations, stimulated conversations and spontaneous expression, where the instructor is involved only with the recorded version of such conversation or expression, in accordance with principle (5) of the method.

It must be noted in conclusion that, since all the learners are called upon to work and talk without pause, long teaching sessions are not a necessity, periods of an hour or an hour and a half per day being generally enough. Since the learners continually work at the same speed imposed on them by the recordings, they all speak in unison, thereby enabling a skilled instructor to supervise the work of all the members of a group simultaneously.

I claim:

1. A method of teaching and learning foreign languages by means of recorded materials for use by at least a first and a second learner wherein learners are instructed to produce a succession of linguistic performances in response to a succession of recorded stimuli considered together with a related succession of spoken stimuli supplied by the learners themselves including the steps of:
   (a) arranging at least a first and a second learner constituting a learner pair in conversational relation to each other;
   (b) aurally communicating respectively to the first and second learners a first and a second stimulus, said first and second stimulus being recorded in said recorded materials and being communicated to said first and second learners by means of a single earphone per learner, said first and second stimuli being different from each other, said first stimulus being communicated exclusively to said first learner of each learner pair, said second stimulus being communicated exclusively to said second learner of each learner pair;
   (c) aurally communicating to the second learner a third spoken stimulus, said third stimulus being communicated verbally to said second learner by said first learner in response to said first recorded stimulus;
   (d) aurally communicating to the first learner a fourth spoken stimulus, said fourth spoken stimulus being communicated verbally to said first learner by said second learner in response to both said second recorded stimulus and said third spoken stimulus;
   (e) repeating steps (b), (c) and (d) whereby a conversation between the first and second learner under control of said recorded material is maintained.

2. A method according to claim 1 including the steps of:
   (a) arranging on a first channel of said recording medium said first stimulus and the correct response to said first stimulus, the correct response being arranged to follow in time said first stimulus with a time delay equal to the reaction time of a native speaker of normal speech ability;
   (b) arranging on a second channel of said recording medium said second stimulus and the correct response to said second stimulus, the correct response to the second stimulus being arranged to follow in time said second stimulus and said third spoken stimulus with a time delay equal to the reaction time of a native speaker to said second and third stimuli.

3. An apparatus for the teaching and learning of foreign languages for use by at least two learners constituting a learner pair wherein each of said learners receives recorded verbal cues transmitted from a record medium and wherein at least one learner of said learner pair also receives spoken cues received from the other learner and wherein at least one learner is instructed to produce a succession of linguistic performances in response to the combination of said recorded and spoken cues considered together including:
   (a) a record medium having at least a first and a second channel;
   (b) means for transmitting information contained on said first channel exclusively to said first learner of each learner pair;
   (c) means for transmitting information contained on said second channel exclusively to said second learner of each learner pair;
   (d) said information contained on said first channel being arranged to include a continuing sequence of verbal cues and a corresponding continuing sequence of responses arranged in the following sequence:
   a first verbal cue;
   a correct response to said first verbal cue;
   the correct response being delayed in respect to said first verbal cue by a time delay equal to the reaction time of a native speaker for responding to said first verbal cue;
   (e) said information contained a said second channel being arranged to include a continuing sequence of verbal cues and responses arranged in the following sequence:
   a second partial verbal cue;
   a second correct response to said second verbal cue considered together with a third spoken verbal cue communicated to the second learner by the first learner;
   said second correct response to said second recorded verbal cue considered together with said third spoken verbal cue being delayed with respect to said second and third verbal cues by a time delay equal to the reaction time of a native speaker for responding to said second and third verbal cues, with said time delay being uniquely dependent upon said second and third verbal cues.

4. A method of teaching and learning foreign languages for use by at least one learner wherein the learner is instructed to produce a succession of linguistic performances in the target languages in response to a succession of recorded stimuli wherein the learner is instructed to respond to the stimuli simultaneously with a recorded correct response which is recorded with a time delay equal to the reaction time to said stimuli of a native speaker of normal speech ability, including the steps of:
   (a) arranging on a record medium a plurality of continuing sequences of stimuli and a plurality of continuing sequences of responses corresponding in time to said stimuli sequences, this arranging step including:
(i) arranging on said record medium at least a first recorded stimulus which calls for a linguistic response from the learner;
(ii) arranging on said record medium at least a first recorded correct response to said first stimulus;
(iii) arranging on said record medium at least a second recorded stimulus which calls for a linguistic response from the learner, said second stimulus being recorded so as to be subsequent in time to said first correct response;
(iv) arranging on said record medium at least second correct response;
(v) said first correct response being arranged on said medium to follow in time said first stimulus with a first time delay equal to the reaction time of a native speaker of normal speech ability to said first stimulus;
(vi) said second correct response being arranged on said medium to follow in time said second stimulus with a second time delay equal to the reaction time of a native speaker of normal speech ability to said second stimulus;
(vii) said first and said second time delays being uniquely dependent upon said first and said second stimuli;
(b) providing the learner with a listening means;
(c) transmitting the stimuli contained on said record medium to said learner with each stimulus being followed by a correct response after a time delay equal to the reaction time of a native speaker of normal speech ability to the particular stimulus;
(d) instructing said learner to respond to said stimuli simultaneously with the recorded correct responses, whereby the learner is forced to respond to a series of recorded stimuli as a native speaker would respond to these stimuli.

* * * * *

UNITED STATES PATENT AND TRADEMARK OFFICE
CERTIFICATE OF CORRECTION

PATENT NO. : 4,170,834
DATED : October 16, 1979
INVENTOR(S) : Ian Russel Smart

It is certified that error appears in the above-identified patent and that said Letters Patent are hereby corrected as shown below:

Column 5, line 21, after non-conductor, change "," to --;--

Column 9, line 68, after "speaker" delete --of normal speech ability--

Column 10, line 7, after "speaker" insert --of normal speech ability--

Signed and Sealed this

Fourth Day of March 1980

[SEAL]

Attest:

SIDNEY A. DIAMOND

Attesting Officer

Commissioner of Patents and Trademarks